Dec. 25, 1951 R. A. C. BRIE 2,579,647
ROTARY WING AIRCRAFT
Filed April 1, 1947 2 SHEETS—SHEET 1
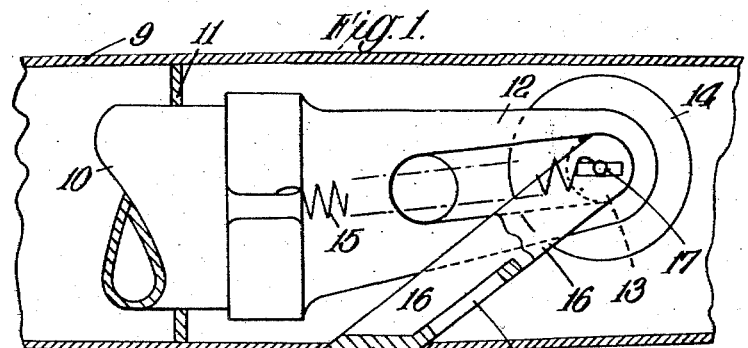
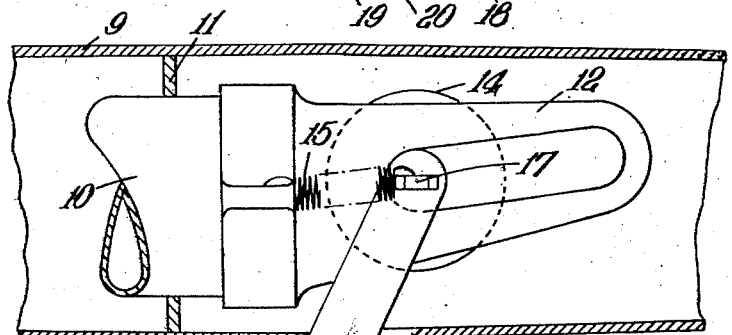
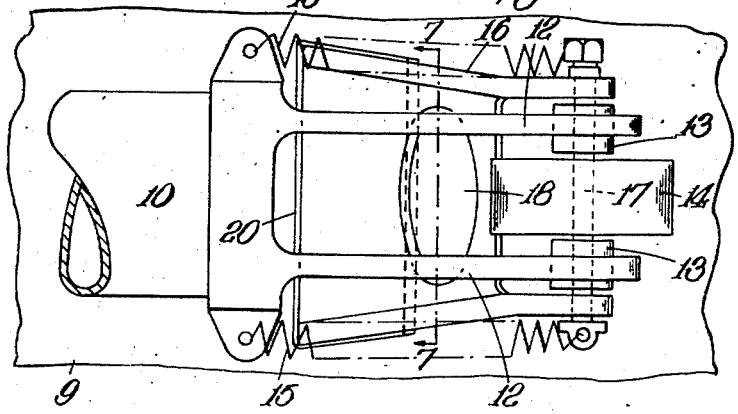
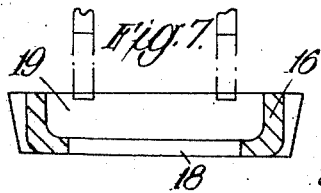
INVENTOR
Reginald A. C. Brie
BY
ATTORNEYS

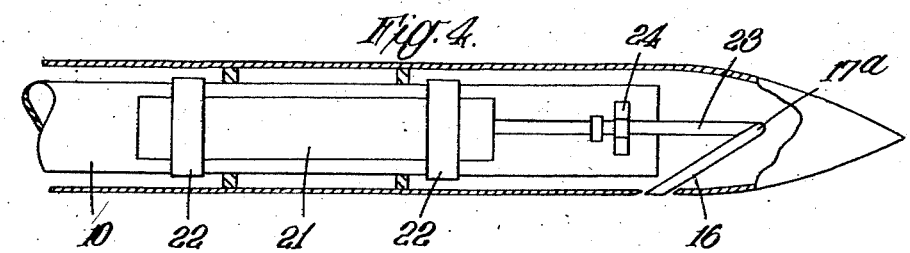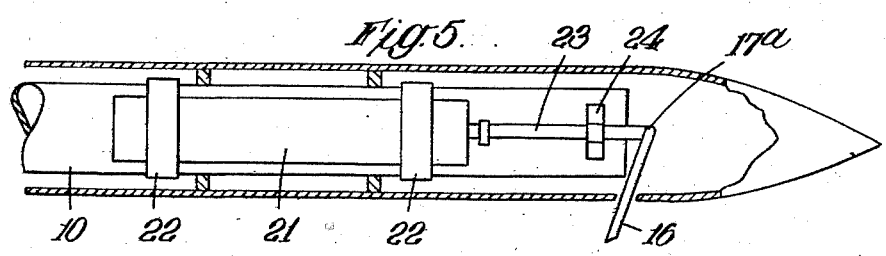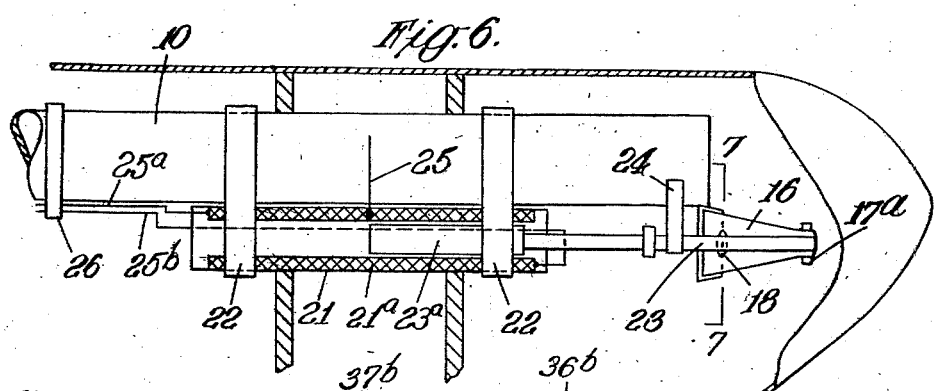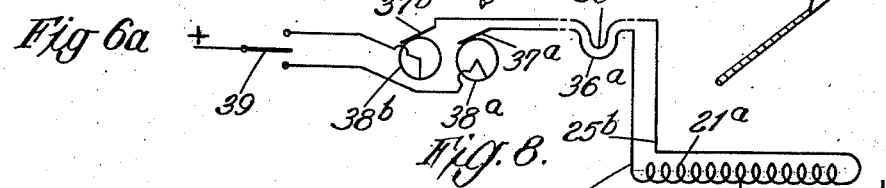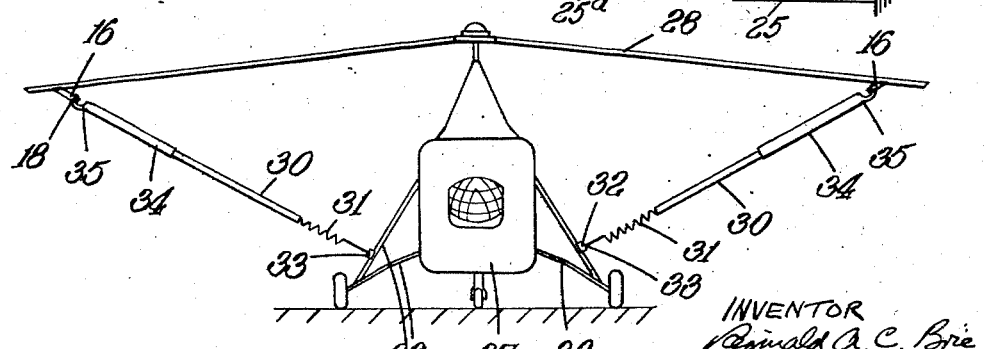

Patented Dec. 25, 1951

2,579,647

UNITED STATES PATENT OFFICE 2,579,647

ROTARY WING AIRCRAFT

Reginald A. C. Brie, Twickenham, England

Application April 1, 1947, Serial No. 738,530
In Great Britain August 30, 1945

12 Claims. (Cl. 244—17.17)

The object of this invention is to provide improved means for securing the rotor-blades of rotary-wing aircraft, such as helicopters and rotaplanes when the aircraft is parked.

When not rotating, the rotor blades of such aircraft, being light, relatively flexible and usually connected to the hub by hinge-joints permitting flapping, are very susceptible to disturbance by the wind, especially by gusts having a component directed from the blade tip towards the hub; even moderate gustiness may set the blades into violent oscillations or, if flapping hinges are provided, cause them to rise up smartly and strike the stops limiting upward flapping; and there is consequently great danger of damage to the blades or/and hub mechanism, unless the blades are properly tethered.

Hitherto a common practice has been to put covers in the form of loose bags over the blades when parking; and to lash the covers to the fixed structure of the air frame, the lashing usually being attached to the covers or bound round them and the blades at points well outboard toward the blade tips.

This method is cumbrous, especially because the height of the rotor blades from the ground makes the process of putting on the covers difficult; and with increase of size of aircraft and consequent increase of height of the rotor from the ground this difficulty is aggravated.

According to this invention a rotor blade of such an aircraft is provided with a retractable picketing eye, which may be operated either by a remote control device, or automatically by centrifugal force, so as to retract when the rotor rotates at more than a certain speed; or a combination of the above methods of operation may be used.

The retractable picketing eye is preferably so shaped and mounted that in the retracted position it fills the opening in the blade through which retraction is effected and conforms as closely as possible to the external surface of the blade, the retraction-operating mechanism being housed within the blade.

The picketing eye may be formed in or mounted on a member which rocks on a pivot or slides in guides carried by the blade between two extreme positions, in one of which the eye protrudes and in the other is retracted into a recess to lie flush with the blade profile; the remainder of the movable member is at all times housed within the blade.

The movable member in which the eye is formed may be weighted in such a way that it tends to move towards the retracted position under centrifugal force, when the rotor rotates; and it may be spring loaded to return to the extended position when the rotor stops rotating or slows down.

Alternatively, it may be positively actuated in one direction, by a pilot-operated remote control device, the blade-mounted elements of which are housed within the blade profile; the return movement, of extension or retraction as the case may be, being effected either by spring means, or, in the case of retraction, by centrifugal force; or the control device may be double-acting, both extension and retraction being effected by it.

The remote control of the operating device may conveniently be electrical, the working element being for example a single or double-acting solenoid.

The cockpit end of the control may, if desired, be coupled to one of the usual aircraft controls, e. g. the parking brake, the fuel cock, or the rotor brake, to operate in the appropriate sense.

When the picketing eye is in the extended position, it can be engaged by a hook on the end of a guy wire whose other end can be secured to a suitable point of the fixed part of the airframe, or is permanently so attached, the guy wire when not in use being stowed inside the body of the aircraft.

Preferably, the hook for engaging the blade-mounted picketing eye is carried on the end of a stiff rod, long enough to enable the eye to be picked up by the ground-handling crew without using step ladders or platforms, the guy wire being attached to the end of the rod remote from the hook.

To avoid snatch, the guy wires may each include a resilient element, e. g. a short length of shock absorber cording or a fairly stiff spring.

The nature of the invention and how it may be performed will be better understood from consideration of the specific examples of the invention which are illustrated in and will be described with reference to the accompanying drawings, of which, Fig. 1 is an elevation, partly in section, of the tip of a rotor-blade of a rotary-winged aircraft, with a retractable picketing eye retracted;

Fig. 2 is a view similar to Fig. 1 with the retracted eye extended;

Fig. 3 is an underneath plan view, partly sectioned, of the retractable picketing eye and its mounting;

Figs. 4 and 5 are views similar to Figs. 1 and 2, showing an alternative construction;

Fig. 6 is a plan view of the construction of Figs. 4 and 5 partly in section;

Fig. 6A is an electrical circuit diagram supplementary to Fig. 6;

Fig. 7 is a detail view in section on the line 7—7 of Figs. 3 and 6;

Fig. 8 is a somewhat schematic front elevation of a rotary-winged aircraft showing the method of picketing the rotor blades.

In Figs. 1 and 2, the rotor blade comprises a skin supported on ribs 11, which are mounted on a tubular spar 10. The end of the spar supports guides 12 on which a roller 13 carrying a weight 14 is guided to move in the span wise direction of the blade. The roller is mounted on a centre pin 17 to the ends of which springs 15 are connected the springs being anchored to a fitting on the end of the spar 10. The pin 17 also constitutes a hinge pin on which a member 16 is hinged. The member 16 is a channel section stamping with side extensions forming arms which hinge on the pin 17 and has a shovel-like end 19 provided with a picketing eye 18, as shown in Figs. 3 and 7. The member 16 extends through an opening 20 in the skin 9 of the underside of the blade and is guided in this opening. In the retracted position of member 16 shown in Fig. 1, the end 19 of member 16 fills the opening 20 and lies flush with the surface of the blade.

The springs 15 urge the member 16 into the extended position shown in Fig. 2 in which the member 16 protrudes through opening 20 exposing the picketing eye 18. When the rotor rotates and reaches a prescribed speed of rotation the centrifugal force acting on weight 14 overcomes the effort of springs 15 and retracts the member 16 within the blade as shown in Fig. 1.

In the construction shown in Figs. 4, 5 and 6, the member 16 with its picketing eye 18 is hinged at 17a to a rod 23 axially movable in a guide 24. The rod 23 forms an extension of the moving armature 23a of a solenoid 21 secured to the spar 10 by straps 22 with its axis in the span wise direction of the blade.

Movement of the rod 23 by the solenoid 21 serves to retract or extend the member 16 as shown in Figs. 4 (retracted position) and 5 (extended position).

The solenoid may be single-acting with spring return (spring not shown) in either direction, or double-acting, as shown in Fig. 6, the coil or winding 21a having a grounded central tap 25 and the ends of coil 21a being connected by leads 25a, 25b secured to the spar 10 by a clip 26.

The leads 25a, 25b are led to the blade root where they are continued by flexible elements 36a, 36b to accommodate flapping and terminate in brushes 37a, 37b making contact with slip rings 38a, 38b on the rotor axle, respectively connected to the poles of a reversing control switch 39 in the cockpit. These electrical connections are illustrated in a purely diagrammatic way in Fig. 6A.

In this construction, retraction and extension of the picketing eye is remotely controlled from the cockpit by the pilot.

Fig. 8 shows the method of picketing the rotor blades of a rotary-winged aircraft comprising a body 27, rotor 28 and under-carriage 29. Guy wires 30 incorporating a short length of spring 31 have at their lower ends hooks 32 engageable with eyes 33 provided on the under-carriage struts 29, and the other ends of the guys are connected to lengths of stiff rods 34 terminating in hooks 35 engageable with the picketing eyes 18 of member 16. The lengths of rod 34 enable the guys to be hooked on to the picketing eyes without using step ladders or platforms.

What I claim is:

1. A rotor blade for an aircraft having a bladed lifting or sustaining rotor, of the kind in which the blades extend radially from a hub, said blade having an opening in its external surface, a member movable through said opening between a retracted position within the blade contour and an extended position in which it projects beyond the blade contour, and means housed within the blade for retracting and extending said movable member, said member having an extremity shaped to fill said opening and conform to the external blade surface in said retracted position and a picketing eye housed within the blade in said retracted position but exposed externally of the blade surface in said extended position.

2. A rotor blade as claimed in claim 1, in which the retracting and extending means is responsive to centrifugal force to retract the eye when the rotor of which the blade forms part rotates at a speed exceeding a critical speed of rotation.

3. A rotor blade as claimed in claim 2, said retracting and extending means including spring means housed within the blade for extending the movable member at speeds of rotation below the mentioned critical speed.

4. A rotor blade as claimed in claim 1 having remotely controllable power means housed within the blade for extending the movable member by positive controlled action.

5. A rotor blade as claimed in claim 4, in which the mentioned power means is double-acting and serves for retracting as well as extending the movable member by positive controlled action.

6. A rotor blade as claimed in claim 5, in which the power means comprises a double-acting solenoid.

7. A rotor blade as claimed in claim 1, having a guideway mounted within the blade skin adjacent the opening for guiding the movement of the inner end of said movable member which enters and is also guided by the opening.

8. A rotor blade as claimed in claim 7, in which the means for retracting the movable member consists of a weight mounted on the movable member at the end guided by the guideway, and the means for extending the movable member consists of a spring attached to the same end of the movable member and reacting on the blade structure so as to urge the guided end of the movable member towards the centre of rotation of the blade, the guideway being substantially parallel to the radial axis of the blade, and the opening in the blade skin being so positioned that as the guided end of the movable member moves towards the blade tip said movable member is retracted into the blade.

9. A rotor blade as claimed in claim 7, in which the means for extending and retracting the movable member consists of a double-acting, remotely controllable, solenoid mounted on the blade structure within the skin, the core of the solenoid being movable and connected with the inner end of the movable member.

10. A rotary-winged aircraft having a bladed lifting or sustaining rotor, whose blades extend radially from a hub, each of said blades incorporating a retractable picketing eye and means for retracting and extending the picketing eye, and remotely controllable means for operating said retracting and extending means.

11. A rotor blade as claimed in claim 1, said retracting and extending means moving said member in a direction generally toward the blade tip in retraction and away from the blade tip in extension.

12. A rotary-winged aircraft having a bladed lifting or sustaining rotor whose blades extend radially from a hub, at least one blade having a picketing-eye member movable relative to said blade between an extended position in which the picketing eye projects from the blade for use in picketing the aircraft and a retracted position in which said picketing eye is withdrawn within the blade during flight, and means responsive to rotor speed for moving said member automatically to said retracted position when said rotor speed exceeds a critical value.

REGINALD A. C. BRIE.

REFERENCES CITED

The following references are of record in the file of this patent:

UNITED STATES PATENTS

| Number | Name | Date |
|---|---|---|
| 1,905,776 | Wilford | Apr. 25, 1933 |
| 1,955,501 | Jette | Apr. 17, 1934 |
| 2,021,470 | Upson | Nov. 19, 1935 |
| 2,110,443 | Larsen et al. | Mar. 8, 1938 |
| 2,405,777 | Buivid | Aug. 13, 1946 |